United States Patent
Crosbie

(10) Patent No.: US 8,061,128 B2
(45) Date of Patent: Nov. 22, 2011

(54) DIESEL PARTICULATE FILTER OVERSTRESS MITIGATION

(75) Inventor: Gary M. Crosbie, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 800 days.

(21) Appl. No.: 12/120,886

(22) Filed: May 15, 2008

(65) Prior Publication Data

US 2009/0282811 A1     Nov. 19, 2009

(51) Int. Cl.
*F01N 3/00*      (2006.01)
*B01D 39/00*    (2006.01)
*B01D 41/00*    (2006.01)

(52) U.S. Cl. ............... 60/295; 60/285; 55/282.3

(58) Field of Classification Search .......... 60/295; 55/282.3, 428.1; 95/283
See application file for complete search history.

(56) References Cited

U.S. PATENT DOCUMENTS

| | | | |
|---|---|---|---|
| 5,610,844 A | 3/1997 | Maus et al. | |
| 6,245,306 B1* | 6/2001 | Miyazaki et al. | 423/215.5 |
| 6,594,990 B2* | 7/2003 | Kuenstler et al. | 60/295 |
| 6,964,694 B2 | 11/2005 | Rauchfuss et al. | |
| 6,984,253 B2 | 1/2006 | Ichikawa et al. | |
| 7,047,729 B2 | 5/2006 | Van Nieuwstadt et al. | |
| 2005/0188686 A1* | 9/2005 | Saito et al. | 60/297 |
| 2005/0284142 A1* | 12/2005 | Patil et al. | 60/311 |
| 2006/0021331 A1 | 2/2006 | Cizeron et al. | |
| 2006/0096280 A1 | 5/2006 | Zhan et al. | |
| 2007/0283683 A1* | 12/2007 | Bellinger | 60/285 |

FOREIGN PATENT DOCUMENTS

JP      61268812      11/1986

* cited by examiner

*Primary Examiner* — Thomas E. Denion
*Assistant Examiner* — Jason Shanske
(74) *Attorney, Agent, or Firm* — Julia Voutyras; Alleman Hall McCoy Russell & Tuttle LLP

(57) ABSTRACT

Methods and systems for reducing overstress of a DPF are provided herein. One example of such a method is based on radial temperature gradient near the exit face of the diesel particulate filter. In this way, it becomes possible to more closely correlate radial stresses to actual risk of DPF fracture.

15 Claims, 6 Drawing Sheets

DIESEL PARTICULATE FILTER OVERSTRESS MITIGATION

BACKGROUND AND SUMMARY

Temperature non-uniformity within a diesel particulate filter (DPF) occurs during filter regeneration. This non-uniformity is a growing concern because it has become especially large with the filters used with modern diesel engines with low engine-out levels of the nitrogen oxides. In the past, those nitrogen oxide gases have served to passively oxidize carbon soot and thereby remove the accumulated soot. With the modern engines, the diesel soot accumulates in the filter until an active step is taken to initiate soot combustion, beginning an active regeneration, to burn off most of the soot within a relatively short time interval, and creating more severe temperature non-uniformity. Even with the choice of low coefficient of thermal expansion ceramics, such large temperature non-uniformity from an active regeneration can create internal stresses that are sufficiently large to fracture the filter ceramics. In DPFs of the single-brick monolithic form that is preferred for large-volume manufacturing and economy, fracture across the monolith causes a sudden, catastrophic, and irreversible loss of filtration performance. This uncertainty about maintenance of filtering function with monoliths has inhibited their wider use. Indeed this risk for monoliths has led to wide commercial use of multi-segment mortared structures, in spite of the associated high material and manufacturing costs.

Thus, to reduce the risk of sudden failure and to extend the working life of an economical monolithic DPF that is subjected to multiple regenerations, one would directionally seek to reduce the temperature non-uniformity in the DPF during regeneration. More particularly, one would reduce the non-uniformity in a way that lowers the stress in the ceramic to a level below some particular level that related to the strength of the ceramic and its coefficient of thermal expansion. In a research environment, this particular relationship can be developed by means of finite element analysis based on temperatures detected by a full field of tens of temperature sensors. To simplify the calculation, the filter ceramic body can be adequately approximated as a continuum material with a relatively simple type of non-isotropy, namely, one with physical properties generated from isotropic properties of the honeycomb wall materials in the particular geometry of the particular honeycomb. With such finite element calculations carried out at a series of time points during a regeneration, one may estimate the moment-by-moment internal stresses within the DPF and the corresponding probability of failure. This approach is suited for research.

However, the applicant herein recognizes that placing tens of sensors throughout a DPF is costly and will not be practical outside of a research and advanced development environment. Likewise, having a less appropriate estimator will either keep the in-use stresses lower than necessary or will lead to failures. If the stresses are kept too low, the operation leads to inefficiencies in the amount of fuel used to initiate more particulate filter regenerations than otherwise needed. If the less appropriate estimator errs on the other side, more failures will occur. Without having an appropriate simple estimator, the particulate filter might have to be designed for tolerance of fracture through the use of multi-segment mortared structures, but this approach increases manufacturing costs unnecessarily and serves as a concern for reduced emission reduction performance characteristics over time.

As such finite element methods are cumbersome, simplified methods and systems for preventing the stress of a DPF are provided herein. By estimating the stress from a small number of temperature sensors, one can use more generally the methods to take action to prevent the stress from rising above a critical level for unacceptably high probability of fracture. Although these methods and systems are intended to apply to the more economical monoliths, these methods and systems also apply to mortared structures, wherein the mortar (as manufactured or aged) allows a crack to pass through to the next segment without much deflection, as if it were a monolith.

One example of such a simplified method includes measuring a radial temperature gradient near the periphery near the exiting-flow face of the diesel particulate filter, and adjusting at least one engine operating parameter to control the radial temperature gradient, as indicated by the measured radial temperature gradient at one angular position near the exit face of the diesel particulate filter. An embodiment of this example of such a system includes two near-exit-face temperature sensors configured to measure a radial temperature gradient near the periphery near the exit face of the diesel particulate filter and a controller configured to adjust at least one engine operating parameter based on the measured temperature gradient to limit the stress, as calculated assuming that the same gradient extends deeply into the DPF from the exit face.

Specifically, during an actively initiated DPF regeneration at exhaust flows near idle-engine exhaust gas flow, the high temperature gradients and the high absolute temperature occur through much of the length of the filter. In calculating the stress in the ceramic, the radial thermal gradient is integrated inward toward the center along a line parallel to the flow axis, beginning a value of zero at a chosen free surface, namely, the exit face. When the radial gradient is high through much of the half-length of the filter, the integral is large.

Therefore, it is preferred to have the highest gradients occur less generally within the length of DPF, namely, and preferably, mostly near the exit face and away from the center of the DPF during filter regeneration. In this way, the integral that is calculated is not as large as before, although the local radial gradient near the end face may be the same or higher than in the former case. This localization of the highest gradients may be achieved by design by controlling various engine operating parameters, such as with increased air flow, to move the highest temperatures and gradients to the rear of the DPF. By doing so, the integrated quantity, stress, as experienced by the DPF is lowered. However, the pair of temperature sensors that are both located near the end face is not able to sense the difference that has caused the high gradients to be concentrated near the exit face, therefore leading to a calculation of stresses that are likely to be higher than actual stresses, resulting in unnecessary inefficiency in fuel usage, in the effort to keep the DPF filter from being at risk of fracturing.

The systems and methods provided herein may help to correlate these stresses experienced by the DPF to those estimated with a small number of sensors, which include the two sensors near the exit face, for the radial temperature gradient measurement, as above, near the exit face together with an additional sensor to indicate how deeply into the filter the high temperature extends. In such way, it becomes possible to more closely correlate stresses to actual risk of DPF degradation, in turn, allowing better adjustments of the various DPF regeneration parameters and/or other engine operating parameters to reduce stresses experienced by the DPF during regeneration only as much as is necessary to prevent unacceptable risk of fracture.

DETAILED DESCRIPTION

Figure 1:
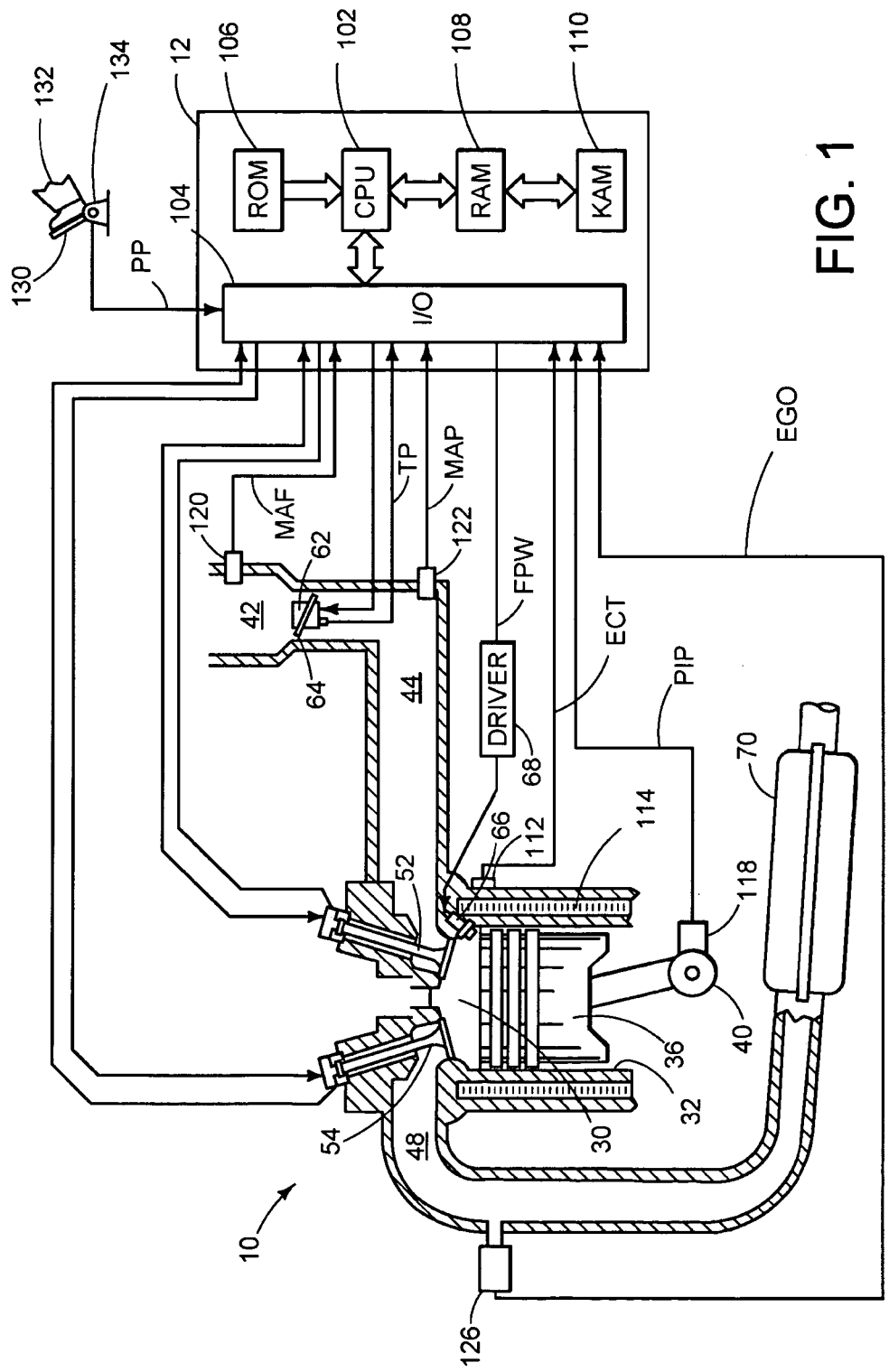
FIG. 1 is an example engine including a DPF overstress mitigation apparatus.

FIG. 1 is a schematic diagram showing one cylinder of multi-cylinder engine 10, which may be included in a propulsion system of an automobile. Engine 10 may include a diesel compression ignition engine. Engine 10 is controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e. cylinder) 30 of engine 10 includes combustion chamber walls 32 with piston 36 positioned therein. Piston 36 is coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 receives intake air from intake manifold 44 via intake passage 42 and exhausts combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the top of the combustion chamber or in the side of the combustion chamber, for example. Fuel is delivered to fuel injector 66 by a fuel system (not shown) which typically includes a fuel tank, a fuel pump, and a fuel rail. In some embodiments, combustion chamber 30 may alternatively or additionally include a fuel injector arranged in intake passage 44 in a configuration that provides what is known as port injection of fuel into the intake port upstream of combustion chamber 30.

Intake passage 42 may include a throttle 62 having a throttle plate 64. In this particular example, the position of throttle plate 64 is varied by controller 12 via a signal provided to an electric motor or actuator included with throttle 62, a configuration that is commonly referred to as electronic throttle control (ETC). In this manner, throttle 62 is operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126. Device 70 may include a lean NOx trap, selective catalytic reduction (SCR) catalyst, particulate filter such as a diesel particulate filter (DPF), a three-way catalyst (TWC), various other emission control devices, or combinations thereof. Specifically, device 70 includes a catalyzed diesel particulate filter having a ceramic substrate.

In some embodiments, during operation of engine 10, emission control device 70 is periodically reset. For example, a diesel particulate filter is regenerated periodically by burning off soot accumulated in the diesel particulate filter.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 receives various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, is generated by controller 12 from signal PIP. As described above, FIG. 1 shows only one cylinder of a multi-cylinder engine, and that each cylinder may similarly include its own set of intake/exhaust valves, fuel injector, glow plug, etc.

Figure 2:
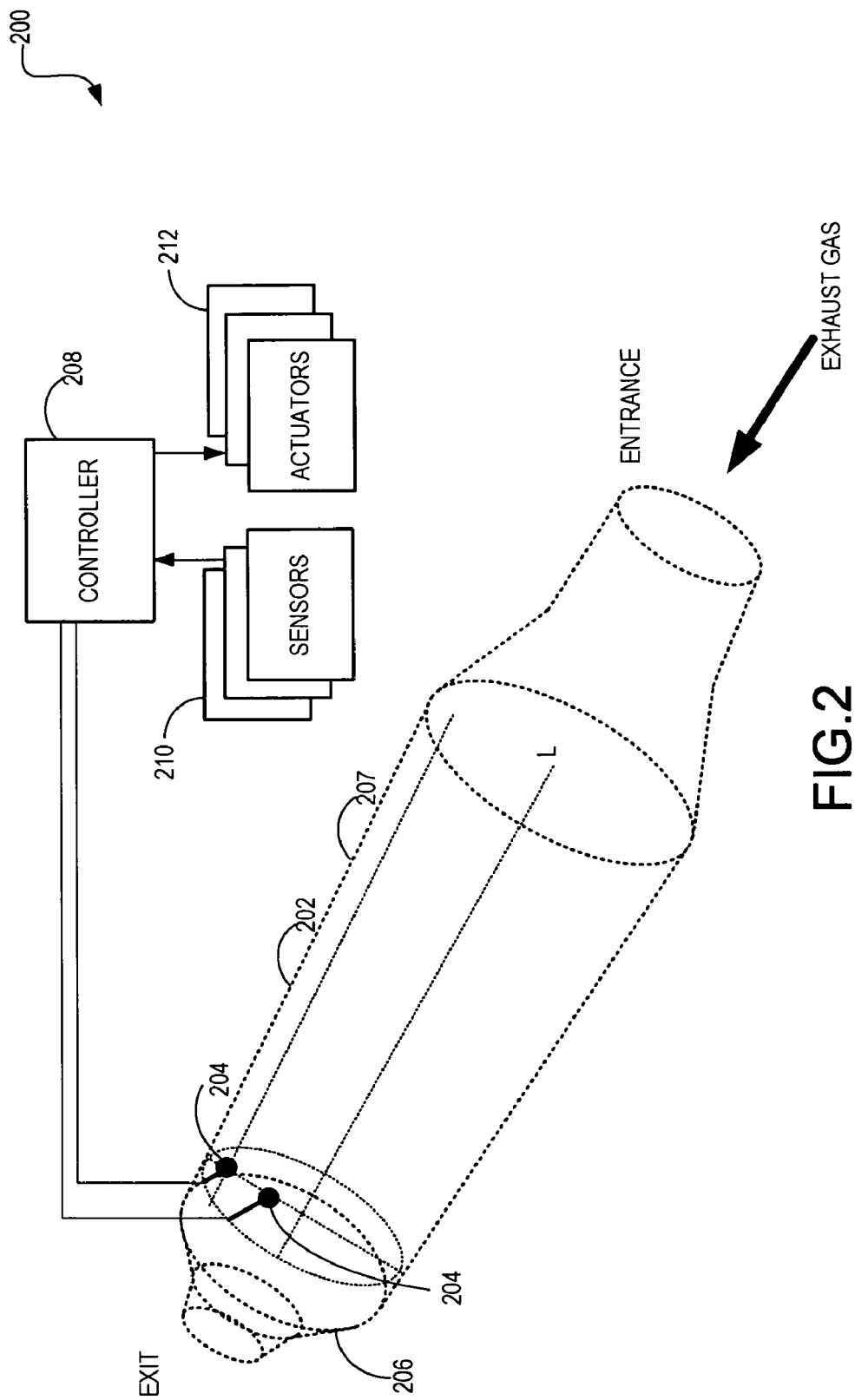
FIG. 2 illustrates an example DPF overstress mitigation apparatus.
Figure 3:
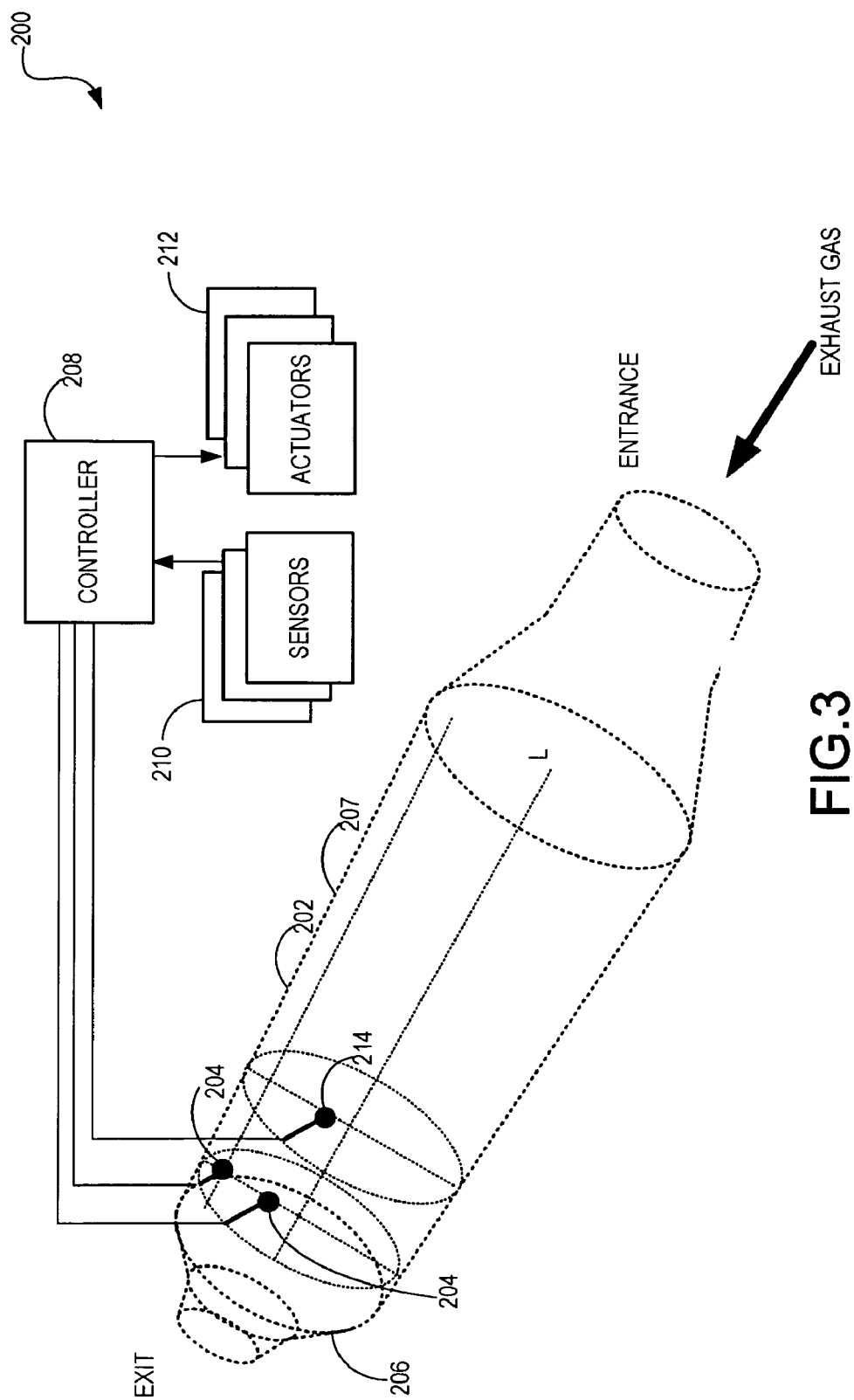
FIG. 3 illustrates another example DPF overstress mitigation apparatus.

FIG. 2 and FIG. 3 illustrate examples of DPF overstress mitigation systems 200 for avoiding mechanical overstress of a diesel particulate filter caused by temperature non-uniformity during regeneration of the DPF. Such overstress may lead to fracture of the DPF filter ceramics, which in turn will lead to loss of DPF filtration performance. For the sake of convenience, similar parts are labeled similarly in FIGS. 2 and 3.

An embodiment of the system 200 includes at least two temperature sensors 204 located near the periphery and close to the exit face 206 portion of the DPF. The temperature sensors 204 are radially spaced from each other (and may be slightly longitudinally displaced from one another in a direction of exhaust flow) for measuring a radial temperature gradient $$\left(\frac{dT}{dr}\right)$$

near the exit face. The system 200 also includes a controller 208 configured to adjust at least one engine operating parameter to provide feedback control of the probability of failure, which is linked to the radial temperature gradient more simply when the equi-temperature contours are cylindrical, for example, when the radial temperature gradient $$\left(\frac{dT}{dr}\right)$$

is greater than a maximum allowable radial temperature gradient $$\left(\text{MAX}\frac{dT}{dr}\right)$$

based on cylindrical equi-temperature contours.

$$\text{MAX}\frac{dT}{dr}$$

may be a predetermined value. Controller 208 may be included in controller 12, or may be another controller in a control system separate from controller 12.

$$\left(\text{MAX}\frac{dT}{dr}\right)$$

The maximum allowable radial temperature gradient is a temperature gradient below which mechanical stress experienced by the DPF is less than a maximum allowable stress (MAXσ) for the volume of material under that high stress, so that an acceptably-low probability of DPF failure is achieved. In some examples, the maximum allowable radial temperature gradient near the exit face is based on the locations of the exit-face temperature sensors that are used to measure the radial temperature gradient near the exit face, the material and cellular geometry of the filter, and the diameter and length of the DPF.

Further, the maximum allowable radial temperature gradient near the exit face may vary with an operating condition of the diesel particulate filter and/or other engine operating parameters, such as air/fuel ratio, exhaust oxygen concentration, velocity of exhaust flow through the diesel particulate filter, the number of times the filter has been regenerated, regeneration frequency, filter age, and/or mechanical properties of the material that constitutes the filter together with any catalyst thereon. For example, if the mechanical strength of the filter is low due to the age of the filter, a large number of regeneration cycles has been performed, and/or the material constituting the filter has been compromised, the maximum allowable temperature gradient may be set lower to reduce the probability of fracture of the filter ceramic material.

In one specific example, the maximum allowable radial temperature gradient measured at 1 inch in from the exit face 206 and between 1 cm and 2 cm from the periphery 207 of the DPF is set to approximately 175° C./cm.

In some examples, the system 200 may also include a deep temperature sensor 214 for measuring a deep temperature ($T_d$) shown in FIG. 3. The deep temperature sensor 214 is positioned away from the exit face 206 and deeper into the diesel particulate filter 202 longitudinally along the direction of overall exhaust flow to a further upstream position than the radial temperature gradient sensors 204 with a radial position similar to the sensor pair. This deep sensor allows estimation of whether the equi-temperature contours within a regenerating DPF are of a more-conical shape or of a more-cylindrical shape. In these examples, the controller 208 may be further configured to adjust the at least one engine operating parameters based further on the measured deep temperature ($T_d$). The controller 28 may for example modify the maximum allowable temperature gradient $$\left(\text{MAX}\frac{dT}{dr}\right),$$

based on the measured deep temperature ($T_d$). In one particular example, the maximum allowable temperature gradient $$\left(\text{MAX}\frac{dT}{dr}\right),$$

in the form of $$\text{MAX}\frac{dT}{dr}\bigg|_{CONECONTOURS}$$

may be calculated using the following equation:

$$\text{MAX}\frac{dT}{dr}\bigg|_{CONECONTOURS} =$$

$$\text{MAX}\frac{dT}{dr}\bigg|_{CYLINDERCONTOURS}\left\{1+\left(\frac{d\left(\frac{dT}{dr}\bigg/\frac{dT}{dr}\bigg|_o\right)}{d\sigma/\sigma_o}\bigg|_{CYL}\right)\right.$$

$$\left.\left(\frac{1000°\text{ C.}-T_d}{1000°\text{ C.}-600°\text{ C.}}\right)\right\}$$

$$\text{MAX}\frac{dT}{dr}\bigg|_{CYLINDERCONTOURS}$$

Where is the maximum allowable radial temperature gradient by finite element analysis (FEA) with cylindrical equi-temperature contours. The middle term is the instantaneous slope of the relation of the radial gradient to the stress in FEA calculations with cylindrical equi-temperature contours. In one example, $$\text{MAX}\frac{dT}{dr}\bigg|_{CYLINDERCONTOURS}$$

is approximately equal to 175° C./cm measured at 1 inch in from the exit face and 1 cm and 2 cm from the periphery 207 of the DPF to achieve a probability of failure of less than 0.002.

Where $T_d$ is the deep temperature, taken as the temperature read at 3.66 inch in from the exit face 206 and 2 cm from a periphery wall 207 of the 8 inch diameter by 10 inch length DPF. In this case, the middle term is 0.7 (dimensionless) for the instantaneous slope of the relation of the radial gradient to the stress in FEA calculations with cylindrical equi-temperature contours.

In some examples, the signal detected by the deep temperature sensor 214 is used to modify an approximate temperature difference signal of the radial gradient temperature sensors 204. The modification can also be carried out via an analog circuit approximating algorithm, a differential thermocouple, such as one that includes two hot thermocouple junctions 204 in series with one reversed, and an appropriately calibrated resistor.

The controller 208 is coupled to various sensors 210 for sensing various engine operating conditions and actuators 212 for controlling parameters of the engine operation. Examples of the sensors 210 and actuators 212 are listed and described in reference to FIG. 1.

The at-least-one engine operating parameter adjusted by the controller 208 for controlling the DPF temperature non-uniformity during regeneration may include, for example, throttle position for adjusting air flow, DPF regeneration frequency, exhaust oxygen concentration, late injection amount, etc. For example, the controller 208 may increase airflow to the DPF to help to cool DPF and push the peak temperature in the DPF during regeneration further towards the exit face of the DPF to decrease the stress experienced by the DPF and the associated probability of failure. Additionally, or alternatively, the controller 208 may increase the frequency of the subsequent DPF regenerations if the radial temperature gradient $$\left(\frac{dT}{dr}\right)$$

has exceeded a allowable temperature gradient $$\left(\text{MAX}\frac{dT}{dr}\right),$$

so that during each subsequent DPF regeneration event, less accumulated soot is burned off, thus reducing maximum temperature and maximum temperature non-uniformity. The controller 208 may likewise decrease exhaust oxygen concentration as by increasing EGR if the measured radial temperature gradient $$\left(\frac{dT}{dr}\right)$$

is greater than a allowable temperature gradient $$\left(\text{MAX}\frac{dT}{dr}\right),$$

thus effectively decreasing the soot combustion rate or terminating the DPF regeneration, which in turn decreases temperatures and temperature non-uniformity inside the DPF. Another alternative measure is for the controller 208 to decrease late injection, which decreases the amount of fuel available in the exhaust, thus helping to decrease the rate of or terminating the DPF regeneration. Further still, combinations of the above approaches may be used.

Referring now to the specific example of the DPF overstress mitigation system 200 shown in FIG. 2, the system 200 is shown to include only two temperature sensors, more particularly two radial temperature sensors 204 positioned at 1 inch in from the exit face 206 of the DPF 202, with one positioned 1 cm in from the periphery 207 of the DPF and the other 202 1 cm closer to a central axis (L) of the DPF. The controller 208 is configured to adjust the at-least-one engine operating parameter to control the radial temperature gradient of the DPF near the exit face 206 based on signals detected by the two near-exit-face temperature sensors 204 and through the various actuators 212 coupled to the controller 208.

Referring now to the example DPF overstress mitigation system 200 shown in FIG. 3, the system 200 is shown here to include two exit-face temperature sensors 204 and one deep temperature sensor. The two exit-face temperature sensors 204 are positioned at 1 inch in from the exit face 206 of the DPF 202. One of the near-exit-face temperature sensors 204 is positioned at 1 cm in from the periphery 207 of the DPF and the other is positioned 1 cm closer to a central axis (L) of the DPF 202. The signal detected by the deep temperature sensor 214 is used to modify a gradient signal detected by the two near-exit-face temperature sensors 204. The controller 208 is configured to adjust the at-least-one engine operating parameter to control the radial temperature gradient $$\left(\frac{dT}{dr}\right)$$

of the DPF near the exit face 206 based on the modified gradient signal and via the various actuators 212 coupled to the controller 208.

Figure 4:
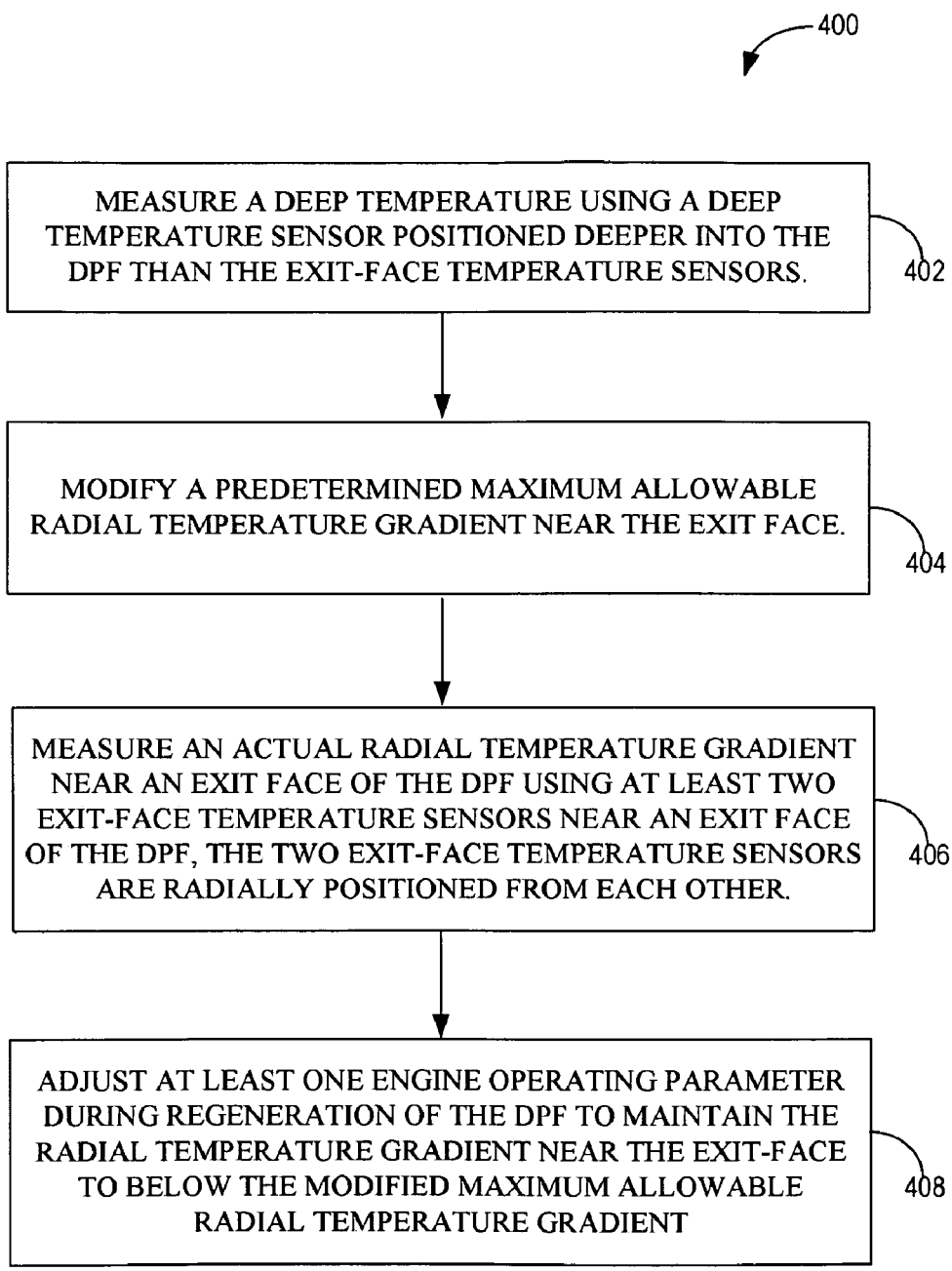
FIG. 4 is a flowchart illustrating a method for avoiding DPF overstress using a DPF overstress mitigation apparatus.

FIG. 4 is a flow chart illustrating an example method 400 for reducing overstress of a DPF, which is implemented in a DPF overstress mitigation system according to the present disclosure. The method 400 includes:

At 402, measuring a deep temperature using a deep temperature sensor positioned deeper into the DPF than the exit-face temperature sensors. In some examples, the DPF overstress mitigation system is provided with a deep temperature sensor. At 404, modifying a maximum allowable radial temperature gradient near the exit face to be higher when the deep temperature is lower than the near-end-face sensor at the same distance from the periphery. The maximum allowable radial temperature gradient near the exit face with such conical equi-temperature contours is increased from a maximum allowable stress of the DPF calculated for cylindrical equi-temperature contours, according to a calculation using the measured deeper temperature.

Again, before modification, the maximum allowable radial temperature gradient near the exit face is based on the readings and locations of the exit-face temperature sensors that are used to measure the radial temperature gradient near the exit face and stresses calculated assuming cylindrical equi-temperature contours.

In examples with deep-temperature sensing, the maximum allowable radial temperature gradient near the exit face is beneficially modified when the measured deep temperature indicates that the equi-temperature contours are more-conical, rather than cylindrical. An example of such modification is discussed in reference to FIG. 3.

As noted above, in some examples, the maximum allowable radial temperature gradient near the exit face itself varies with an operating condition of the diesel particulate filter and/or engine and other factors, as noted.

At 406, measuring an actual radial temperature gradient near the exit face of the DPF using at least two exit-face temperature sensors near the exit face of the DPF, the two exit-face temperature sensors being radially positioned from each other.

At 408, adjusting at least one engine operating parameter during regeneration of the DPF to maintain the radial temperature gradient near the exit face to below the maximum allowable radial temperature gradient, as modified by the calculation including the deep temperature.

As described herein, various engine operating parameters may be adjusted.

Figure 5:
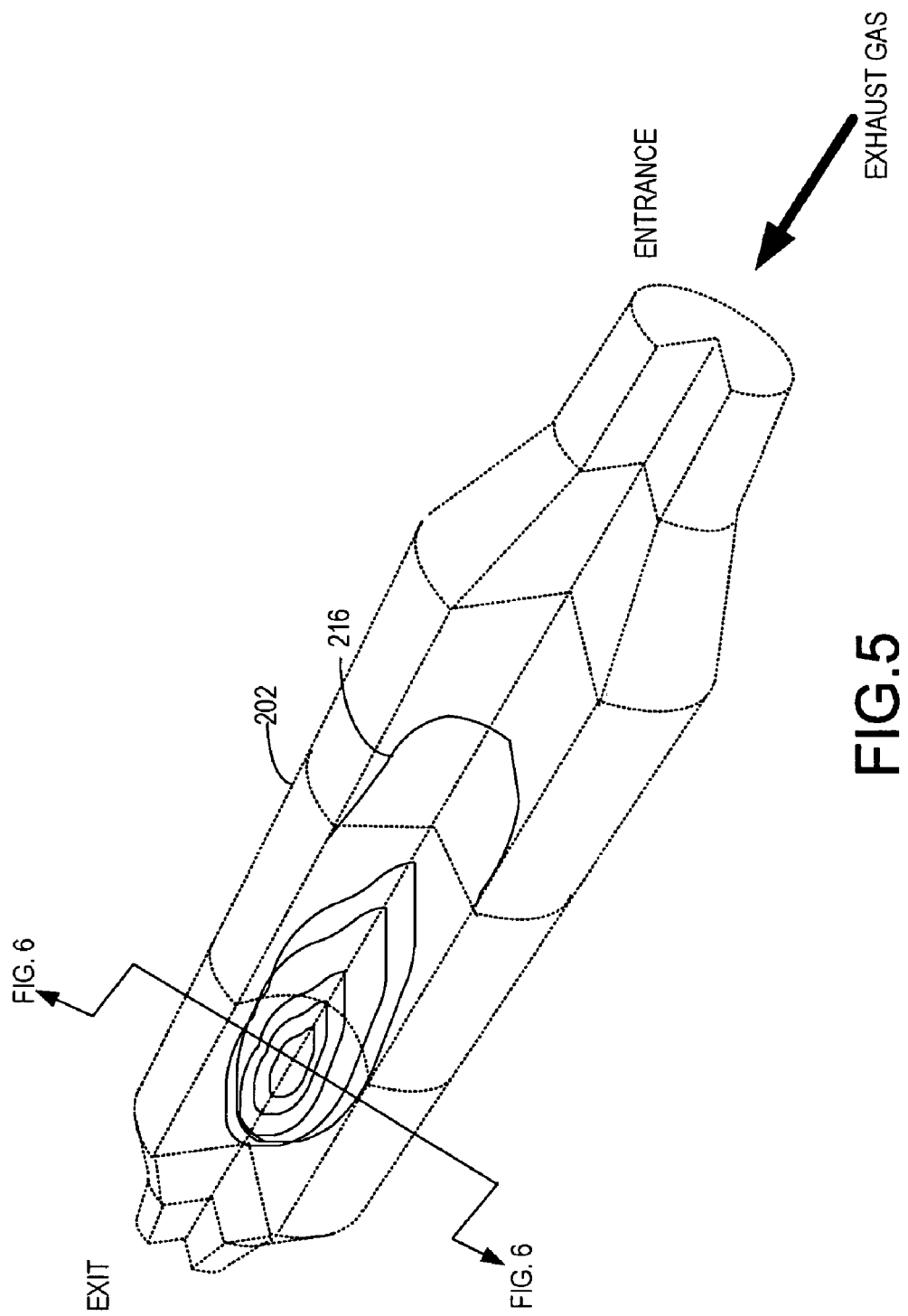
FIG. 5 is a schematic diagram illustrating temperature profile of a DPF during regeneration.
Figure 6:
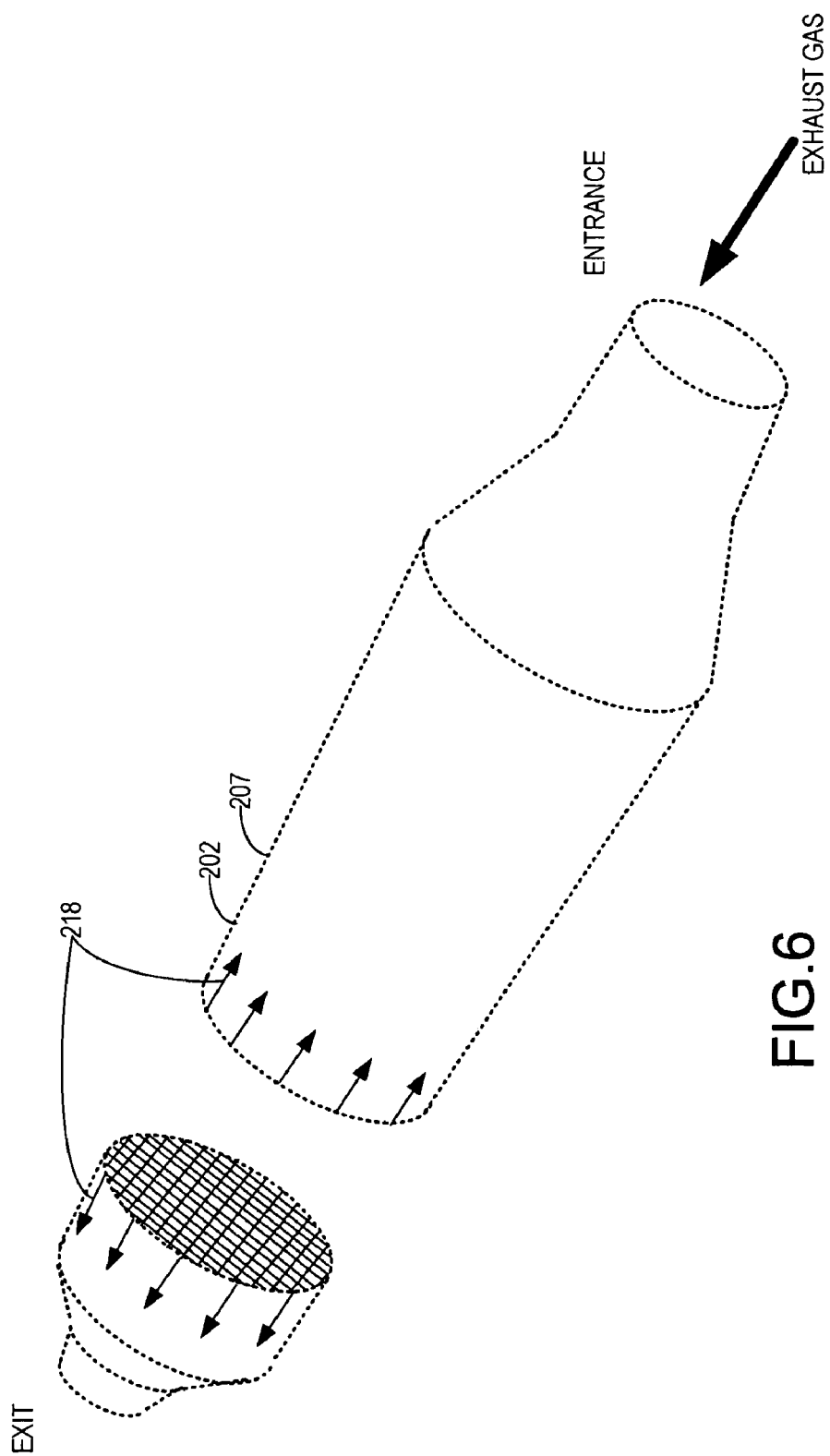
FIG. 6 is a schematic diagram illustrating the fracture causing radial stress resulted from temperature non-uniformity in a DPF during filter regeneration.

FIG. 5 is a schematic diagram that illustrates approximately conical equi-temperature contours formed within a DPF during filter regeneration with peak temperatures pushed to the rear of the filter. As shown by a DPF equi-temperature contour 216 in FIG. 5, the DPF is hotter in the central rear region of the DPF and cooler along the periphery and front of the DPF, with somewhat conical equi-temperature contours. Such temperature non-uniformity still causes the DPF to experience an axial stress which still raises the probability of micro-fracture or fracture of the honeycomb structure of the DPF, as described herein, compared to an unheated DPF. As better shown in FIG. 6, this axial stress 218 with conical equi-temperature contours is less in magnitude than for cylindrical equi-temperature contours with the same near-exit-face radial gradient.

Note that the example control and estimation routines included herein can be used with various engine and/or vehicle system configurations. The specific routines described herein represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, 1-4, 1-6, V-12, opposed 4, and other engine types, such as gasoline direct-injection, homogeneous charge compression ignition (HCCI), and diesel, among others. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for reducing diesel particulate filter overstress, comprising:
adjusting at least one engine operating parameter during particulate filter regeneration in response to a radial temperature gradient near an exit face of the diesel particulate filter, the at least one engine operating parameter including a frequency of subsequent diesel particulate filter regenerations.

2. The method of claim 1 further comprising adjusting the at least one engine operating parameter to maintain the radial temperature gradient below a maximum allowable radial temperature gradient, wherein the maximum allowable radial temperature gradient near the exit face corresponds to a maximum allowable stress of the diesel particulate filter for an acceptably low probability of failure less than a threshold.

3. The method of claim 2, further comprising:
measuring the radial temperature gradient near the exit face of the particulate filter from a plurality of radially separated temperature sensors;
measuring a deep temperature away from the exit face and deeper into the diesel particulate filter from a deep temperature sensor;
wherein the maximum allowable radial temperature gradient near the exit face is modified based on the measured deep temperature.

4. The method of claim 2 further comprising adjusting the at least one engine operating parameter to maintain the radial temperature gradient below a maximum allowable radial temperature gradient, wherein the maximum allowable radial temperature gradient varies with an operating conditions of the diesel particulate filter.

5. The method of claim 2, wherein adjusting responsive to the radial temperature gradient further includes adjusting a throttle position.

6. The apparatus of claim 2, wherein adjusting responsive to the radial temperature gradient further includes adjusting a late injection amount.

7. The method of claim 1, wherein adjusting responsive to the radial temperature gradient further includes adjusting exhaust gas flow to the diesel particulate filter.

8. A diesel particulate filter overstress mitigation apparatus, comprising:
two temperature sensors located in the exit face portion of the particulate filter, the sensors configured to measure a radial temperature gradient near the exit face of the diesel particulate filter; and
a controller configured to adjust at least one engine operating parameter based on the radial temperature gradient, wherein the controller is further configured to adjust the at least one engine operating parameter if the measured radial temperature gradient is greater than a maximum allowable radial temperature gradient, and wherein the maximum allowable temperature gradient is based on locations of the two exit face temperature sensors.

9. The apparatus of claim 8, wherein the maximum allowable radial temperature gradient varies with operating conditions of the diesel particulate filter.

10. The apparatus of claim 8, wherein the at least one engine operating parameter includes exhaust gas flow to the diesel particulate filter.

11. The apparatus of claim 8, wherein the at least one engine operating parameter includes frequency of the subsequent regenerations of the diesel particulate filter.

12. The apparatus of claim 8, wherein the at least one engine operating parameter includes an exhaust oxygen concentration.

13. The apparatus of claim 8, further comprising a deep temperature sensor configured to measure a deep temperature that is deeper into the filter than the two exit face temperature sensors;

wherein the controller is further configured to adjust the at least one engine operating parameter based on the measured radial temperature gradient and the measured deep temperature.

14. The apparatus of claim 13, wherein the maximum allowable radial temperature gradient near the exit face is modified based on the measured deep temperature.

15. A diesel particulate filter overstress mitigation apparatus, comprising:

two exit face temperature sensors configured to measure a radial temperature gradient near the exit face of the diesel particulate filter;

a deep temperature sensor configured to measure a deep temperature that is deeper into the filter; and a controller configured to adjust at least one engine operating parameter if the measured radial temperature gradient is below a maximum allowable radial temperature gradient, the maximum allowable radial temperature gradient being modified based on the measured deep temperature.

* * * * *